United States Patent
Cheng et al.

(10) Patent No.: US 6,411,817 B1
(45) Date of Patent: Jun. 25, 2002

(54) METHOD AND SYSTEM FOR DYNAMIC DOWNLINK POWER CONTROL IN A TIME-DIVISION, MULTIPLEX WIRELESS SYSTEM

(75) Inventors: Terry Sifong Cheng, Randolph; Joe Huang, Parsippany; Aparajita Misra, West Caldwell, all of NJ (US); Kevin John Murphy, Westminster, CO (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/488,543

(22) Filed: Jan. 21, 2000

(51) Int. Cl.⁷ .............................. H04B 7/00; H04Q 7/20
(52) U.S. Cl. ................. 455/522; 455/67.1; 455/450; 455/436; 370/331; 370/318
(58) Field of Search ......................... 455/522, 422, 455/450, 436, 437, 439, 13.4, 67.1, 67.4; 370/331, 329, 318, 321

(56) References Cited

U.S. PATENT DOCUMENTS

| | | | |
|---|---|---|---|
| 6,072,792 A | * 6/2000 | Mazur et al. | 370/345 |
| 6,144,861 A | * 11/2000 | Sundelin et al. | 455/522 |
| 6,154,450 A | * 11/2000 | Wallentin | 370/311 |
| 6,167,035 A | * 12/2000 | Veeravalli et al. | 370/331 |
| 6,185,413 B1 | * 2/2001 | Mueller et al. | 455/405 |
| 6,175,745 B1 | * 6/2001 | Bringby et al. | 455/522 |
| 6,314,299 B1 | * 11/2001 | Schreib et al. | 455/465 |

* cited by examiner

Primary Examiner—Edward F. Urban
Assistant Examiner—Marceau Milord (57) ABSTRACT

A method for controlling downlink power in a time-division multiplex wireless system may provide different downlink transmit signal powers to different time-division multiplex channels of a single carrier. A base station receives a measured signal parameter data for a downlink transmit signal of a time-division multiplex channel. The base station determines an initial adjustment for the downlink transmit signal power of the time division multiplex channel if the measured signal parameter data differs from a target signal parameter data. The base station determines a revised adjustment for the downlink transmit power of the time division multiplex channel based on the initial adjustment and at least one adjustment range as appropriate to achieve synchronization of the demodulation of the downlink transmit signal.

21 Claims, 8 Drawing Sheets

| BIT PATTERN | BER INTERVAL(%) | APPROXIMATE C/I (dB) |
|---|---|---|
| 000 | 0.01>BER | 40 |
| 001 | 0.1>BER>=0.01 | 35 |
| 010 | 0.5>BER>=0.1 | 26 |
| 011 | 1.0>BER>=0.5 | 21 |
| 100 | 2.0>BER>=1.0 | 18 |
| 101 | 4.0>BER>=2.0 | 15 |
| 110 | 8.0>BER>=4.0 | 12 |
| 111 | BER>=8.0 | 10 |

METHOD AND SYSTEM FOR DYNAMIC DOWNLINK POWER CONTROL IN A TIME-DIVISION, MULTIPLEX WIRELESS SYSTEM

FIELD OF INVENTION

This invention relates to a method and system for dynamic downlink power control in a time-division multiplex wireless system.

BACKGROUND

Presently, many time-division multiple-access (TDMA) wireless systems use no dynamic downlink power control based on the actual activity of mobile stations. Instead, the downlink transmit power is typically set at a fixed level high enough to provide an adequate downlink signal to the mobile station receiving the worst downlink signal strength on the carrier. For example, the mobile station receiving the worst downlink signal strength may be located furthest away from a base station site transmitting to this mobile station. Meanwhile, the base station may provide one or more closer mobile stations to the base station site a stronger signal strength than is really required to maintain reliable communications with the furthest mobile station. Accordingly, the difference between the power required by one or more closer mobile stations and the actual power received by the closer mobile stations is, in essence, wasted power that increases co-channel interference. Thus, a need exists for reducing interference and increasing wireless system capacity in a time-division multiplex system through an enhanced downlink power control scheme.

SUMMARY OF THE INVENTION

In accordance with one aspect of the invention, a method for controlling downlink power in a time-division multiplex wireless system may provide different downlink transmit signal powers to different time-division multiplex channels of a single carrier. A base station receives a measured signal parameter data for a downlink transmit signal of a time-division multiplex channel. The base station determines an initial adjustment for the downlink transmit signal power of the time division multiplex channel if the measured signal parameter data differs from a target signal parameter data. The base station determines a revised adjustment for the downlink transmit power of the time division multiplex channel based on the initial adjustment and at least one adjustment range as appropriate to achieve synchronization of the demodulation of the downlink transmit signal. The initial adjustment is based on dynamic measurements of signal parameter data, whereas the revised adjustment may be based on the capabilities of the mobile station or other considerations.

DETAILED DESCRIPTION OF A PREFERRED EMBODIMENT

Figure 1:
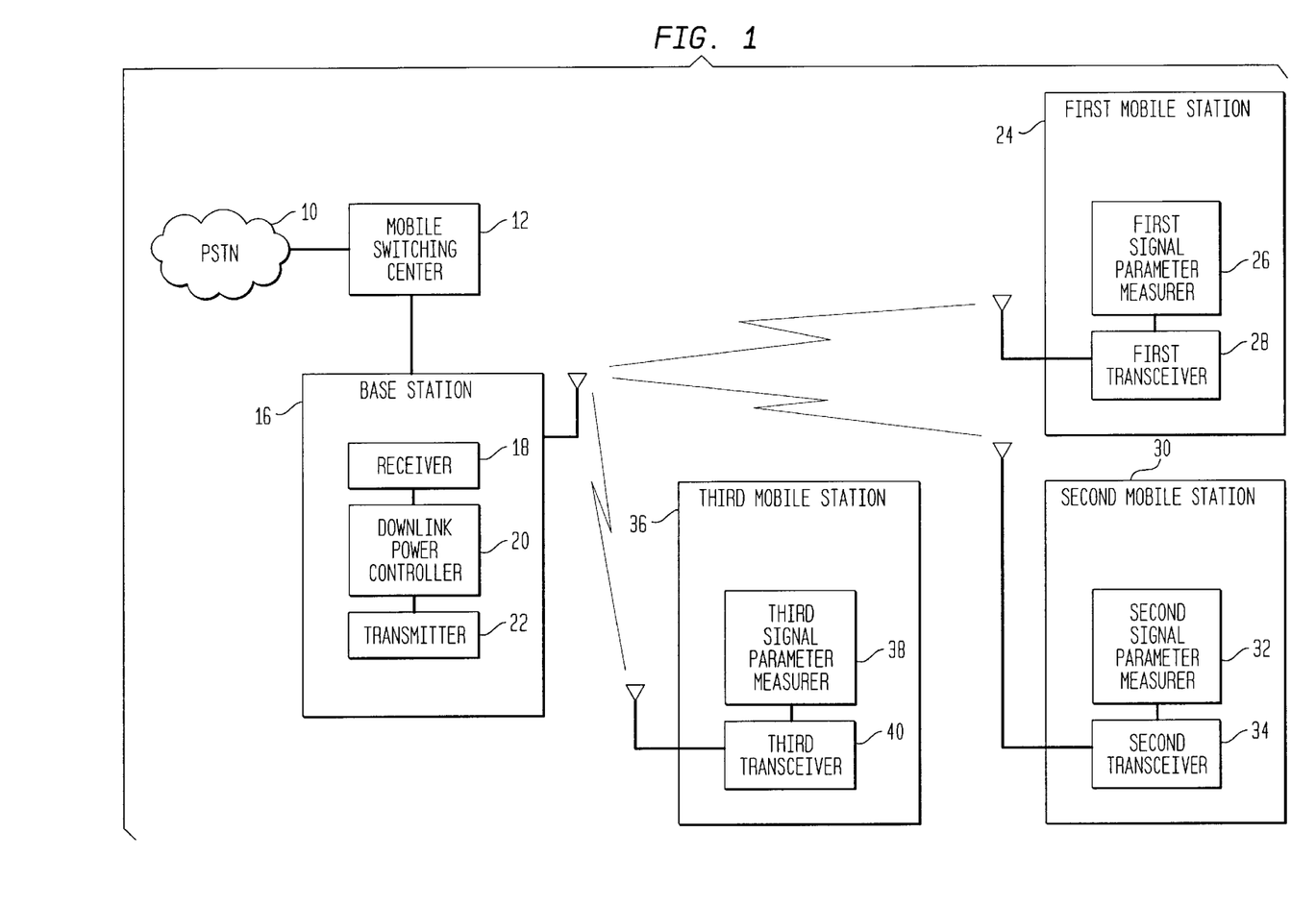
FIG. 1 is a block diagram of one embodiment of a wireless communications system in accordance with the invention.

In accordance with one embodiment of the invention, FIG. 1 shows a time-division multiplex communication system. As used herein, the term time-division multiplex system shall refer to a time-division, multiple-access system, a global system for mobile communications (GSM) or another communication system which assigns different time slots to mobile stations to accommodate communication services to multiple mobile stations individually. The communication system includes a mobile switching center 12 which is preferably coupled to a base station 16 and the public switched telephone network (PSTN) 10. The base station 16 communicates over an electromagnetic carrier to a plurality of mobile stations including a first mobile station 24, a second mobile station 30 and a third mobile station 36. Although, three mobile stations are shown communicating over a single carrier, in an alternate embodiment virtually any number of mobile stations may operate over channels defined on a carrier.

The base station 16 includes a transmitter 22. The transmitter 22 may transmit a downlink signal over a first time-division multiplex channel of the carrier to the first mobile station 24. The base station 16 may transmit a downlink transmit signal over a second time-division multiplex channel of the carrier to the second mobile station 30. The base station 16 transmitter 22 may transmit a downlink transmit signal over a third time-division multiplex channel of the carrier to the third mobile station 36.

The first mobile station 24 receives the first time-division multiplex channel via the first transceiver 28. The second mobile station 30 receives the second time-division multiplex channel via the second transceiver 34 and the third mobile station 36 receives the third time-division multiplex channel via the third transceiver 40. The first signal parameter measurer 26 measures a signal parameter associated with the first time-division multiplex channel to determine whether the downlink signal meets a target signal parameter. A target signal parameter represents a value of a received signal parameter of a downlink signal that provides a desired downlink performance or a desired signal quality level at a mobile station. For example, the target signal parameter may represent a particular signal-to-noise ratio of the downlink signal to provide communications with a desired frame error rate (e.g., 1% maximum frame error rate). A mobile station may be equipped to allow a technician to program a target signal parameter. The second signal parameter measurer 32 measures a signal parameter of the second time-division multiplex channel to determine if the second time-division multiplex channel meets a target signal parameter associated with the second time-division multiplex channel. The third signal parameter measurer 38 measures a signal parameter of the third time-division multiplex channel to determine whether the third channel meets a signal parameter target associated with the signal parameter target.

The signal parameter may represent a signal strength measurement, a bit-error rate measurement, a frame-error rate measurement, a signal-to-interference measurement, a signal-to-noise measurement, or another suitable indicator of signal quality. The target signal parameters for the first time-division multiplex channel, the second time-division multiplex channel and the third time-division multiplex channel may be identical or different depending upon a particular configuration chosen by a service provider operating the wireless system.

The first, second, and third mobile stations (24, 30, 36) may send adjustment data to the base station 16 for the first time-division channel, the second time-division channel and/or the third time-division channel, respectively. The receiver 18 receives the adjustment data for the first time-division channel, the second time-division channel and the third time-division channel and downlink power controller 20 may adjust the transmitter 22 so that the transmit power of the first time-division channel, the second time-division channel, and the third time-division channel meet their respective target signal parameters for a group of successive time intervals. The mobile station (e.g., 24) or the base station 16 may determine, refine, or otherwise process the adjustment data to facilitate adjustment of the downlink transmit power of the base station 16. Although the foregoing adjustment scheme has been described with reference to three time-division channels per carrier, the adjustment scheme may be implemented, in practice, with virtually any number of time-division channels per carrier.

In the wireless system of FIG. 1, the base station 16 includes an integral controller (not shown) for assigning channels to the mobile stations (24, 30, 36) and communicating with the mobile switching center 12. However, if the system of FIG. 1 were a GSM system, it would include a base station controller interconnected between the mobile switching center 12 and the base station 16 to perform control functions and channel assignments for the mobile stations (24, 30, 36).

Figure 2:
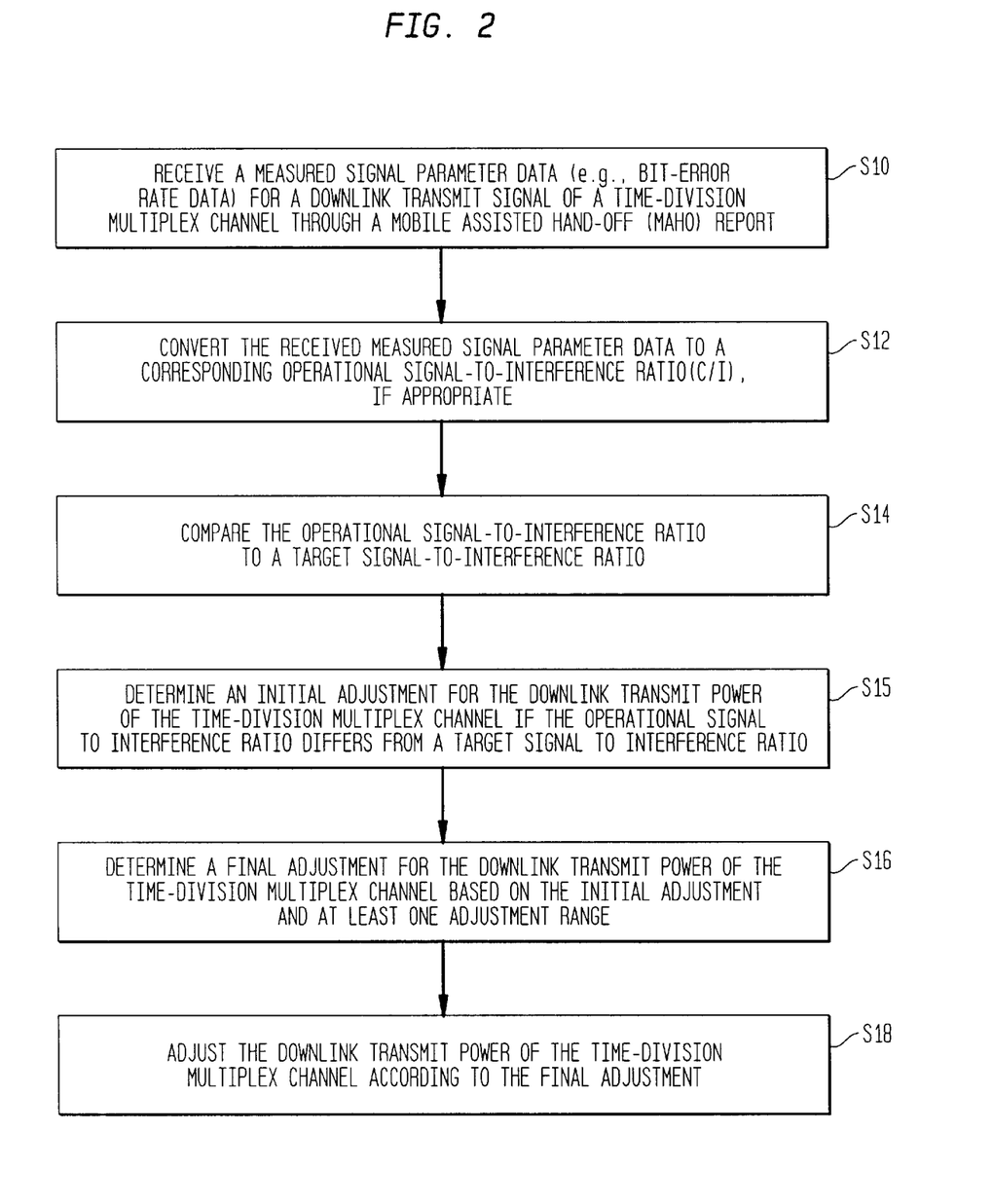
FIG. 2 is a flow diagram of a method for dynamic downlink power control in accordance with FIG. 1.

In accordance with the invention, FIG. 2 illustrates a method for adjusting the downlink transmit power of a time-division multiplex channel in accordance with the wireless system of FIG. 1. Starting in step S10, the base station 16 receives adjustment data in the form of measured signal parameter data (e.g., bit-error rate data) for a downlink transmit signal of a time-division multiplex channel. For example, the base station 16 may receive the adjustment data in a mobile assisted hand-off (MAHO) report. The mobile-assisted hand-off report is generated by one of the mobile stations (24, 30, 36) communicating with the base station 16. Although the measured signal parameter data is typically sent via a mobile assisted hand-off report, in an alternate embodiment the measured signal parameter data may be sent by any type of message data transmitted from a mobile station to the base station 16.

In step S12, the base station 16 converts the signal parameter data to an appropriate format for comparison to the target signal parameter data, which is stored in a reference database accessible by the base station 16. For example, the base station 16 converts the measured bit-error rate data to a corresponding operational signal-to-interference ratio to facilitate comparison to a target signal-to-interference ratio as the target signal parameter. The base station 16 may store a conversion database or a look-up table that relates values of measured signal parameter data associated corresponding signal-to-interference ratios. The base station 16 preferably includes a storage device for storing the reference database and the conversion database.

In an alternate method, the base station 16 may use a mathematical formula to derive a signal-to-interference ratio from a corresponding measured bit-error rate, in lieu of referencing the conversion database.

In step S14, the base station 16 compares a measured or converted signal parameter to the target signal parameter. For example, the base station 16 compares the operational signal-to-interference ratio to a target signal-to-interference ratio for the time-division multiplex channel. The operational signal-to-interference ratio is preferably derived from signal parameter measurements on a channel-by-channel basis so that each of the mobile stations (24, 30, 36) on a carrier has a distinct operational signal-to-interference ratio. The target signal-to-interference ratio maybe the same for all of the mobile stations using a single carrier. However, a service provider may have the option of selecting different levels of target signal-to-interference ratios for each channel on the same carrier.

In step S15, the base station 16 determines an initial adjustment for the downlink transmit power of a time-division multiplex channel if the measured or converted signal-to-interference ratio differs from a target signal-to-interference ratio. For example, if the operational signal-to-interference ratio differs from a target signal-to-interference ratio, the difference between the operational signal-to-interference ratio and the target signal-to-interference ratio for a particular time-division multiplex channel provides the initial adjustment or at least a basis for determining the initial adjustment.

The target signal-to-interference ratio may be set by a service provider. On one hand, if the determined signal-to-interference ratio is below the target signal-to-interference ratio, the base station increases the downlink transmit power to the mobile station. On the other hand, if the determined signal-to-interference ratio is below the target signal-to-interference ratio, the base station decreases the downlink transmit power to the mobile station to reduce co-channel interference and/or increase the traffic capacity of the wireless system.

In a preferred embodiment, the difference between the target signal-to-interference ratio and the operational signal-to-interference ratio is used as the initial adjustment for increases to the downlink transmit power of the time-division multiplex channel. However, in the case of decreases to the downlink transmit power of the time-division multiplex channel, the base station 16 may use the difference (e.g., in decibels) between the operational signal-to-interference ratio and the target signal-to-interference ratio divided by some divisor as the initial adjustment. Accordingly, the initial adjustment downward of a downlink transmit power is preferably less than the difference between the operational signal-to-interference ratio and the target signal-to-interference ratio to protect the reliability of voice or data information transmitted on the time-division multiplex channel. Although the initial adjustment is described in terms of decibel values related to the signal-to-interference ratio, in alternate embodiments the initial adjustment may be accomplished with reference to other signal parameter, such as error rates.

Step S15 represents an initial adjustment for the downlink transmit power which is further defined in accordance with step S16. In step S16, the base station 16 determines a revised adjustment based on the initial adjustment for the downlink transmit power of the time-division multiplex channel. The revised adjustment is based both on the initial adjustment and at least one adjustment range.

An adjustment range may include an absolute adjustment range, a reference adjustment range, or both. The actual decision to use one or more of the different adjustment ranges will depend, in some cases, on the synchronization capabilities of the mobile stations (24, 30, 36) using the wireless system at any given time. The reference adjustment range refers to a maximum allowable difference in downlink transmit power among the time-division multiplex channels carried over a single carrier. That is, the forward channels of a single carrier within a frame cannot differ by more than a certain power differential. For example, a first time-division multiplex channel, a second time-division multiplex channel and third time-division multiplex channel within a frame may not differ by more than a 6 dB power differential to avoid loss of synchronization of the mobile stations.

The reference range is preferably employed to compensate for technical limitations of the particular mobile stations using the wireless system. A basic mobile station is a mobile station that is not modified in any particular way to be compatible with dynamic downlink power control. For example, a basic mobile station may include pre-TIA/EIA (Telecommunication Industry/Association/ Electronics Industry Association) IS-136 Revision A mobiles. An enhanced mobile station is a mobile station that features modifications for power control. For example, an enhanced mobile station may comprise a TIA/EIA IS-136 Revision A mobile station. The reference range is preferably used for basic mobile stations, whereas the reference range is preferably not used for enhanced mobile stations. However, if at least one basic mobile station is on a common carrier, the other mobile stations and the basic mobile station on the same carrier use the reference adjustment range.

A pre-TIA/EIA IS-136 Revision A mobile station monitors more than the time slots that are assigned to the time-division channel for the use of the pre-TIA/EIA IS-136 Revision A mobile station. For example, if the first mobile station 24 is a pre-TIA/EIA IS-136 Revision A mobile station, the first mobile station 24 monitors the time slots associated with the second time-division multiplex channel and the third time-division multiplex channel or any other channel on the common carrier. The first mobile station 24 monitors the second time-division multiplex channel and the third time-division multiplex channel as well as the first channel to properly synchronize its demodulation circuitry to decode the downlink transmit signal.

However, in post-TIA/EIA IS-136 Revision A mobile stations, the mobile station is able to properly synchronize by decoding only its time-division multiplex channel without any reliance on monitoring the other time-division multiplex channels on the same carrier. Thus, no reference range or restriction in variation among different channels of a common carrier is required to maintain synchronization for enhanced or post-TIA/EIA IS-136 Revision A mobile stations on different channels of the common carrier.

The absolute range is distinct from the reference range. The absolute range primarily depends upon limitations of the base station 16, limitations of governmental authorities such as the Federal Communications Commission or the like. In one example, a governmental entity may license the service provider to use a maximum downlink power in a certain geographic region. The base station 16 may not exceed the maximum downlink power without violating a regulation or law or interfering with other communications services. Thus, an authorized maximum power of the absolute range may be determined by the foregoing governmental considerations.

In another example, the base station 16 is not physically capable of exceeding a certain maximum power, which may be referred to as an authorized maximum power of the absolute adjustment range. Similarly, the base station 16 may not be capable of operating properly below a particular minimum downlink transmit power. Accordingly, the minimum authorized power within the absolute reference range may also require consideration. A wireless service provider may also wish to adjust the absolute range or the maximum authorized power to manipulate or define coverage areas of base station sites within a wireless system, even if government restrictions or physical limitations would not require such an adjustment.

The absolute reference range is considered regardless of whether the mobile stations on the wireless communication system are basic mobile stations or enhanced mobile stations. If both the reference adjustment range and the absolute adjustment range are used for the time-division multiplex channels of a carrier, then compliance with the reference range is preferably executed prior to executing compliance with the absolute adjustment range.

In a preferred embodiment, the initial adjustments are merely proposed adjustments and downlink transmit power is not transmitted at the initial adjustment value, unless it is first validated as a bona fide revised adjustment value by compliance with at least one reference range. Accordingly, the a adjustment occurs in step S18 following determination of the revised adjustment in step S16. In step S18, the base station 16 adjusts the downlink transmit power of one of the time-division multiplex channels according to the revised adjustment determined in step S16.

A carrier may serve a group of mobile stations on separate downlink channels. The carrier is transmitted in frames, with each frame potentially containing time-slots representing any channel within the group (e.g., 3 channels in TDMA) of downlink channels. Adjacent slots within a frame are usually associated with different time-division multiplex channels. Enhanced mobile stations on a single carrier are able to tolerate drastic power changes between adjacent time slots within a frame of a downlink signal.

In one illustrative embodiment, the base station 16 may adjust the power as frequently as once every 25 frames (e.g., 1 second) before being updated with the next mobile assisted hand-off (MAHO) report. The MAHO report is readily available or modifiable for transmission of desired power adjustment data in many commercially available mobile stations. However, in another embodiment, instead of using the MAHO report, the mobile station may transmit adjustment data as a data message at an interval shorter than once every 25 frames.

The mobile station could transmit power adjustment data to the base station 16 to facilitate downlink transmit power adjustment as frequently as from one time slot to the next during a frame. For changes in power between successive time slots, the base station 16 preferably makes the power adjustment during the last two symbols of a time slot such that downlink transmit power is not necessarily uniform for an entire time slot. However, two consecutive slots for one time-division multiple channel or one mobile station should not change by more than allowed under the applicable standard. For example, for a TDMA system two consecutive slots should not change by more than one dB under current standards.

Figure 3:
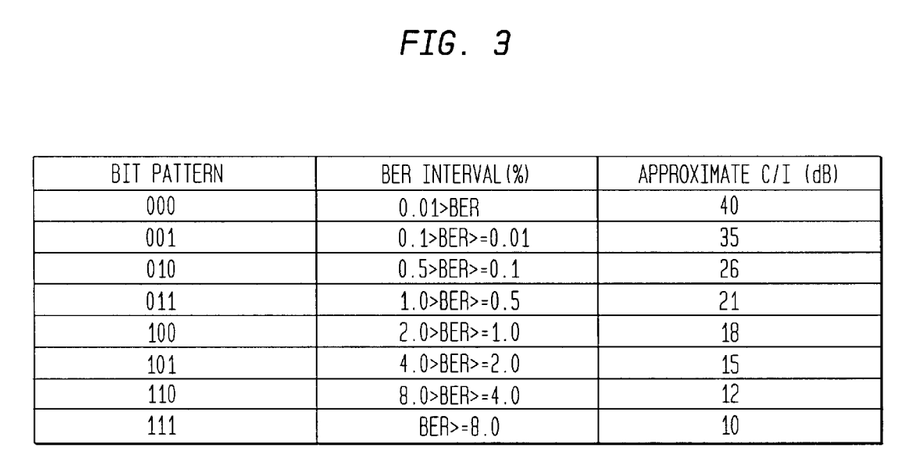
FIG. 3 is a chart of the conversion database that illustrates a possible relationship between bit-error rate and an approximate signal-to-interference ratio for adjusting downlink power in accordance with the method of FIG. 2.

In accordance with FIG. 3, a conversion database is shown that includes a bit-error rate interval and a corresponding approximate operational signal-to-interference ratio for the bit-error rate interval. The bit-error rate range may be identified by a bit pattern shown in the first column. The mobile station may transmit the bit pattern over a reverse channel during a mobile assisted hand-off report or otherwise. The conversion database provides correlation information between the bit-error rate and signal-to-interference radio. The conversion database is preferably stored in a storage device and the base station 16 for reference in step S12 of FIG. 2.

Figure 4:
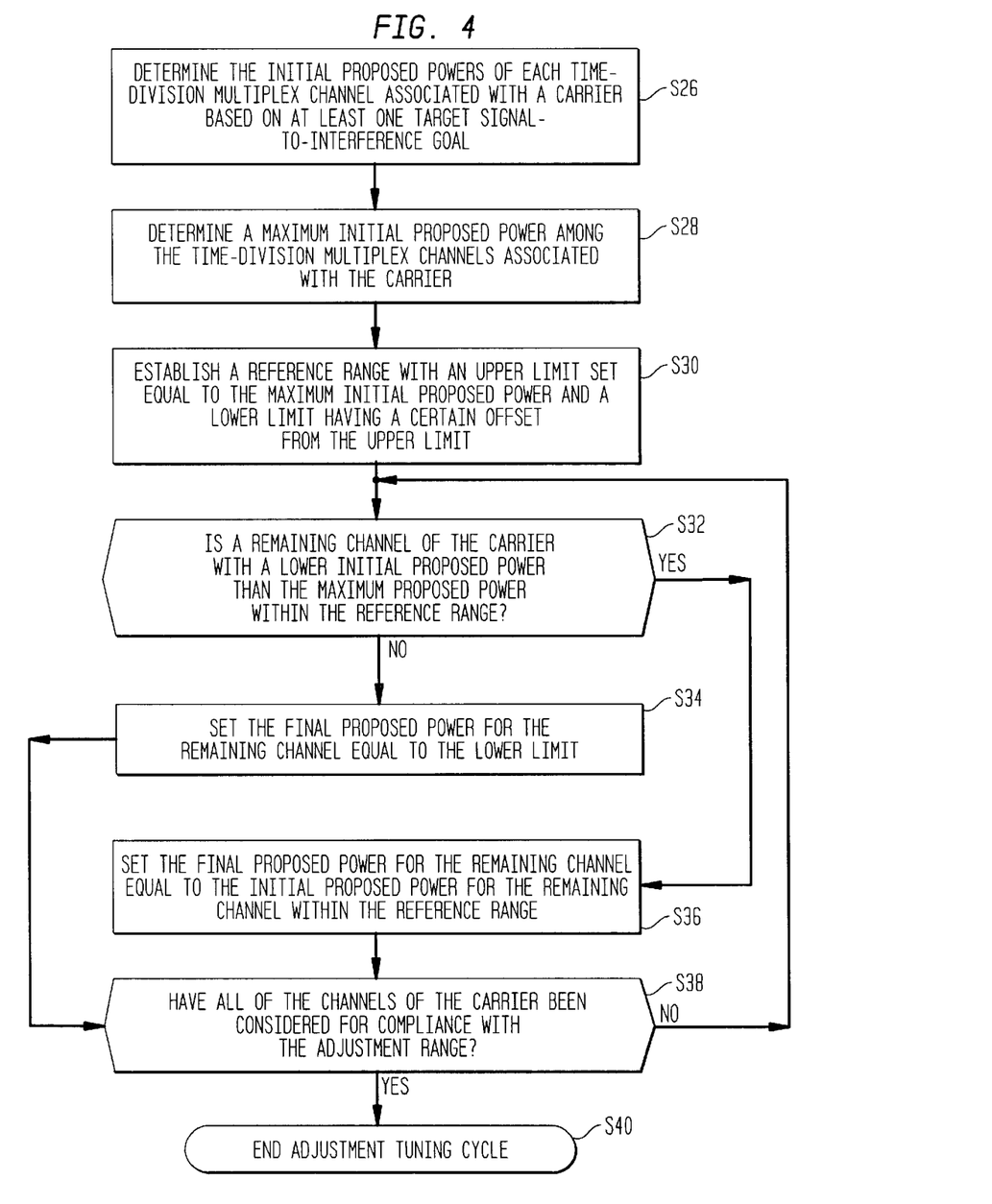
FIG. 4 is a flow diagram of a method of determining an adjustment of a downlink transmit power based on compliance with a reference adjustment range in accordance with the invention.

FIG. 4 illustrates a reference adjustment step S16 in FIG. 2 in more detail. Starting in step S26 of FIG. 4, the base station 16 determines the initial proposed powers of each time-division multiplex channel associated with a carrier based on at least one target signal-to-interference goal. The time-division multiplex channels associated with the carrier may have distinct target signal-to-interference goals or an identical target signal-to-interference goal. The initial adjustment powers may be determined based on the difference between the operational signal-to-interference ratio and the target signal-to-interference ratio in accordance with step S15. The initial proposed power represents a potential downlink transmit power for a particular time-division multiplex channel that would result from application of the initial adjustment power determined in step S15 of FIG. 2.

After step S26 in step S28, the base station 16 determines a maximum initial proposed power among the time-division multiplex channel associated with the carrier. For example, if the carrier includes three time-division multiplex channels with initial proposed powers $P_{i1}$, $P_{i2}$ and $P_{i3}$, the base station 16 determines and designates the highest downlink transmit power among $P_{i1}$, $P_{i2}$ and $P_{i3}$ as the maximum initial proposed power.

In step S30, the base station 16 establishes a reference range with an upper limit set equal to the maximum initial proposed power and a lower limit having a certain offset from the upper limit. The reference range extends from the upper limit to the lower limit. The actual extent of the reference range depends upon the particular mobile stations using the wireless system and their synchronization tolerance to the reference range. In a preferred embodiment, the reference range is preferably set to approximately 6db, although in other embodiments other reference ranges may be used.

Following step S30 in step S32, the base station 16 determines if a remaining channel of a carrier has a lower initial proposed power lower than the maximum proposed power. If so, the base station 16 determines whether the lower initial proposed power falls within the reference range. If the lower initial proposed power of the remaining channel falls within the reference range, then the method continues with step S36. However, if the lower initial proposed power of the remaining channel is outside of the reference range, then the method continues with step S34.

In step S34, the base station 16 sets the final proposed power for the remaining channel equal to the lower limit. In step S36, the base station 16 sets the final proposed power for the remaining channel equal to the initial proposed power for the remaining channel because the remaining channel falls within the reference range.

Following either step S34 or S36, the method continues with step S38. In step S38, the base station 16 determines if all of the time-division multiplex channels of the carrier have been considered for compliance with the reference adjustment range. If all of the channels have not been considered, the method continues with step S32 until all of the channels have been considered. Finally, once all of the channels of the carrier have been considered for compliance with the reference adjustment range, the method ends with the step S40 which represents an end of an adjustment tuning cycle for the carrier. The foregoing method may be repeated for a plurality of cycles during a call of a mobile station on a time-division multiplex channel of the carrier.

In the context of dynamic downlink control in accordance with the of invention, a handoff decision is made on substantially the same basis as it would be without the fine tuning of the power adjustment of FIG. 4. Therefore, records of initial proposed powers or intermediate values should be kept to provide proper hand-off decision.

Figure 5:
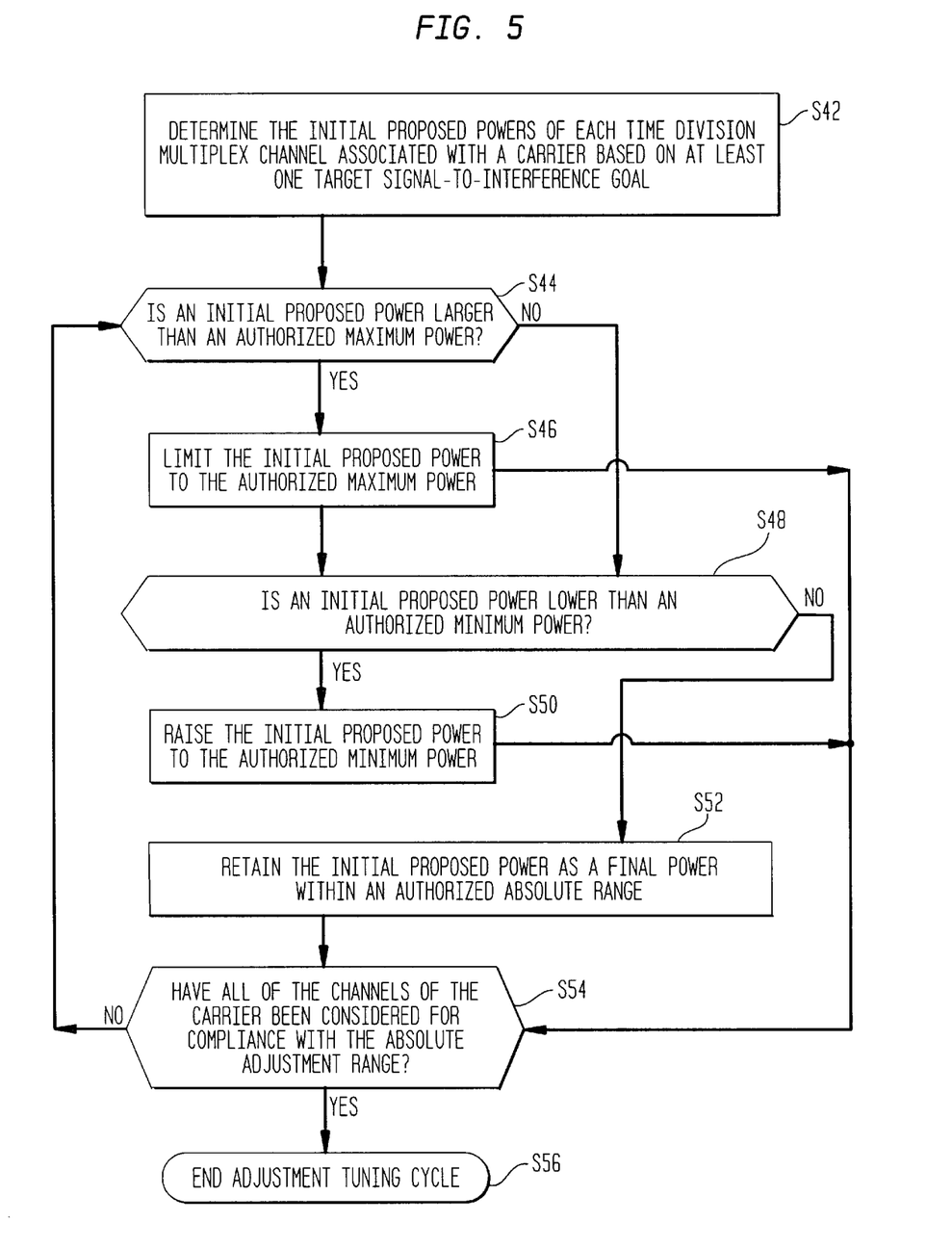
FIG. 5 is a flow diagram of a method of determining an adjustment of a downlink transmit power based on compliance with an absolute adjustment range in accordance with the invention.

FIG. 5 illustrates a procedure for adjusting the downlink transmit power in accordance with an absolute adjustment range. FIG. 5 explains step S16 of FIG. 2 in more detail with respect to the absolute adjustment range. FIG. 5 is carried out in step S16 regardless of whether or not mobile stations using the base station 16 are basic mobile stations (e.g., pre-TIA/EIA IS-136 Revision A mobile stations) or enhanced mobile stations (e.g., post-TIA/EIA IS-136 Revision A mobile stations).

FIG. 5 begins with step S42 in which the base station 16 determines the initial proposed powers of each time-division multiplex channel associated with the carrier based upon at least one target signal-to-interference ratio goal. The target signal-to-interference ratio goal is selected on a carrier or on a time-division multiplex channel basis. The determination of the initial proposed powers is preferably accomplished in accordance with step S15 of FIG. 2.

After step S42 in step S44, the base station 16 determines if an initial proposed power is larger than an authorized maximum transmit power. If the initial proposed power is larger than the authorized maximum transmit power, then the method continues with step S46. However, if the initial proposed power is not larger than the authorized maximum transmit power, then the method continues with step S48.

In step S46, the base station 16 limits the initial proposed power to the authorized maximum transmit power by setting the final proposed power equal to the authorized maximum transmit power. Therefore, the final proposed power of the time-division multiplex channel is restricted to the authorized maximum transmit power. After step S46 the method continues with step S54.

In step S48, the base station 16 determines if the initial proposed power is lower than an authorized minimum power. If the initial proposed power is lower than an authorized minimum power, then the method continues with step S50. Otherwise, if the initial proposed power is not lower than the authorized minimum power, the method continues with step S52.

In step S50, the base station 16 raises the initial proposed power to the authorized minimum power. That is the final proposed power is raised to represent the authorized minimum power. After step S50, the method continues with step S54.

In step S52, which may follow step S48, the base station 16 retains the initial proposed power as the final proposed power within an authorized absolute adjustment range. The authorized absolute range is bounded by the authorized minimum power and the authorized maximum transmit power. As previously explained, the authorized maximum transmit power and minimum power primarily depend upon the technical, licensing, and other considerations of the base station 16. The base station 16 may not be licensed to use more than the authorized maximum transmit power in a particular geographic region govern by a governmental body, such as the Federal Communications Commission. Similarly, the base station 16 power amplifier may be restricted to an authorized minimum power because of technical limitations of various stages of a power amplifier and adequately reliable radio frequency coverage, or otherwise.

In step S54, the base station 16 determines if all of the time-division multiplex channels of the carrier have been considered for compliance with the absolute adjustment range. If all of the channels of the carrier have not been considered for compliance with the absolute adjustment range, the method continues with step S44 until all of the channels of the carrier have been considered. Once all of the channels of the carrier have been considered for compliance with the absolute adjustment range, the method continues to step S56 which represents the end of the adjustment tuning cycle of the carrier. The foregoing adjustment tuning cycle may be completed multiple times during a call to a mobile station. The technique may be accomplished at regular time intervals or whenever an adjustment to the downlink transmit power is considered to be triggered by the measured signal parameter performance of a mobile station on the carrier.

The power adjustment procedures in FIG. 4 and FIG. 5 reflect different concerns and may be implemented individually or collectively. FIG. 4 addresses power control that considers the technical specifications of mobile stations, whereas FIG. 5 addresses power control that considers technical specifications of the base station supporting the mobile stations.

Figure 6A:
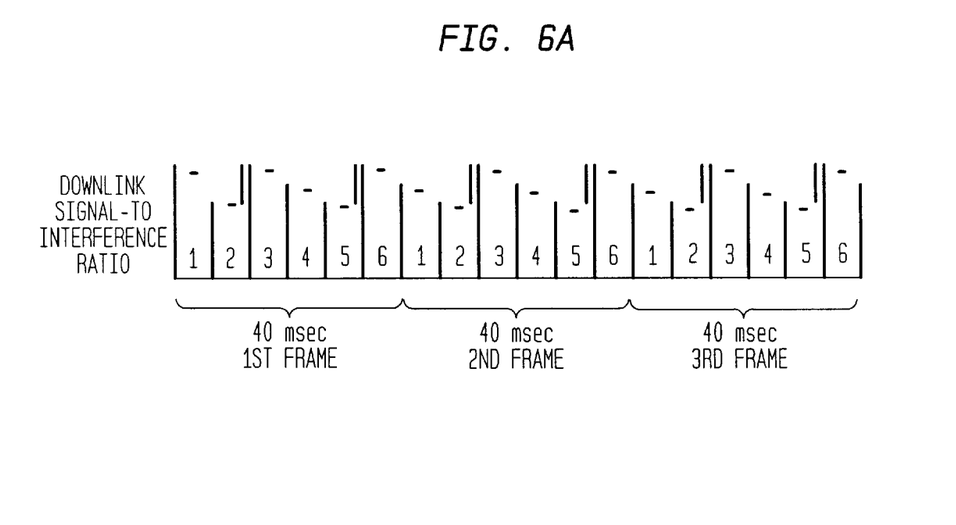
FIG. 6A and FIG. 6B illustrate the relative power levels of time-slots within frames for the power control method of FIG. 4.
Figure 6B:
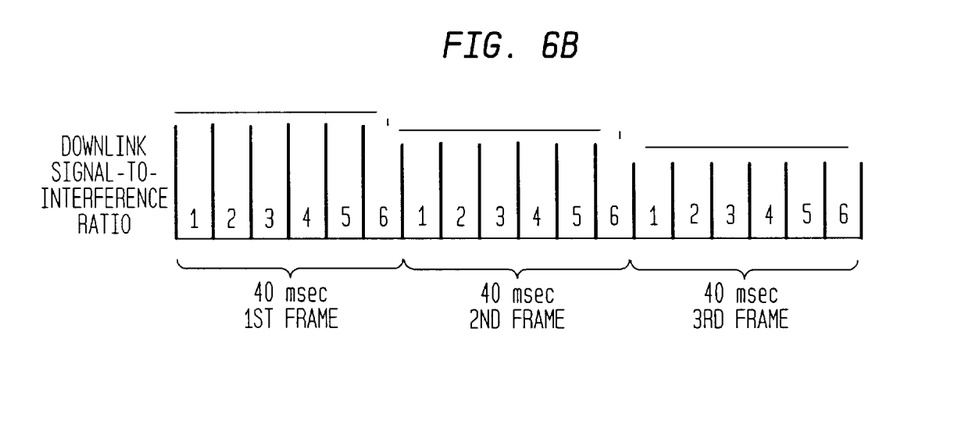
Figure 6C:
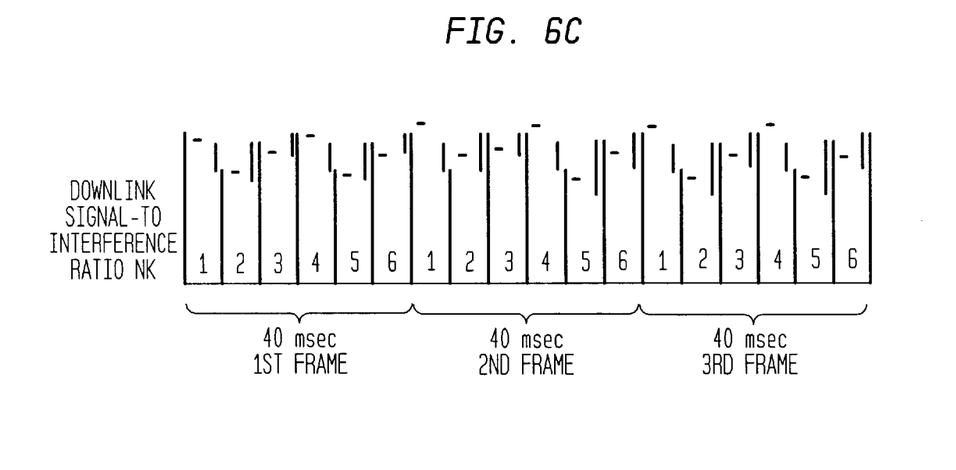
FIG. 6C illustrates the relative power levels of time-slots within frames for the power control method of FIG. 5.

FIG. 6A through FIG. 6C illustrates some possible signal strength relationships between different time-division multiplex channels on a carrier. The vertical axes of FIG. 6A, FIG. 6B and FIG. 6C represent downlink signal strength or downlink signal-to-interference ratio. The horizontal axes of FIG. 6A, FIG. 6B, and FIG. 6C represent successive frames transmitted on a single carrier. Each frame has a frame duration (e.g. 40 milliseconds).

FIG. 6A through 6C illustrates three frames in accordance with a time-division, multiple-access (TDMA) system frames. Time slots 1 and 4 preferably represent a first time-division multiplex channel. Time slots 2 and 5 preferably represent a second time-division multiplex channel and time slots 3 and 6 preferably represent a third time-division multiplex channel. In FIGS. 6A, 6B, and 6C, the successive time slots of a single time-division multiplex channel may not differ more than a tolerance downlink variation. In accordance with present standards for time-division multiple access (TDMA) systems in North America, the variation is limited to one dB between successive time slots for a given TDMA channel. The variation may prevent over adjustment of the signal downlink transmit signal power in response to misperceived variations in the downlink signal parameter measurer.

FIG. 6A represents the type of signal strength values that may be obtained by applying the procedure of FIG. 2 to pre-TIA/EIA IS-136 Revision A mobile stations in which the maximum deviation between station time slots associated with different mobile stations can only vary by a maximum of the reference range (e.g., 6 dB).

FIG. 6B represents a situation where the reference range is assigned a value of zero dB. Accordingly, the present technique can be used to mimic the performance of a current time-division, multiple access system in which all of the channels within a frame have the same signal parameter value or the same signal-to-interference ratio. While such power control can be used to compensate for fading with a frequency commensurate with the frame duration (e.g., 40 milliseconds), such frame-by-frame power control does not offer the same near-far interference reduction benefits as does the configuration of FIG. 6A.

FIG. 6C illustrates operation of post-TIA/EIA IS-136 Revision A mobile stations in which variations between adjacent time slots associated with different time-division multiplex channels may vary drastically relative to each other. The configuration of FIG. 6C does not restrict time-division multiplex channels to downlink transmit power within the reference range, which is applicable to pre-TIA/EIA IS-136 Revision A mobile stations.

Figure 7:
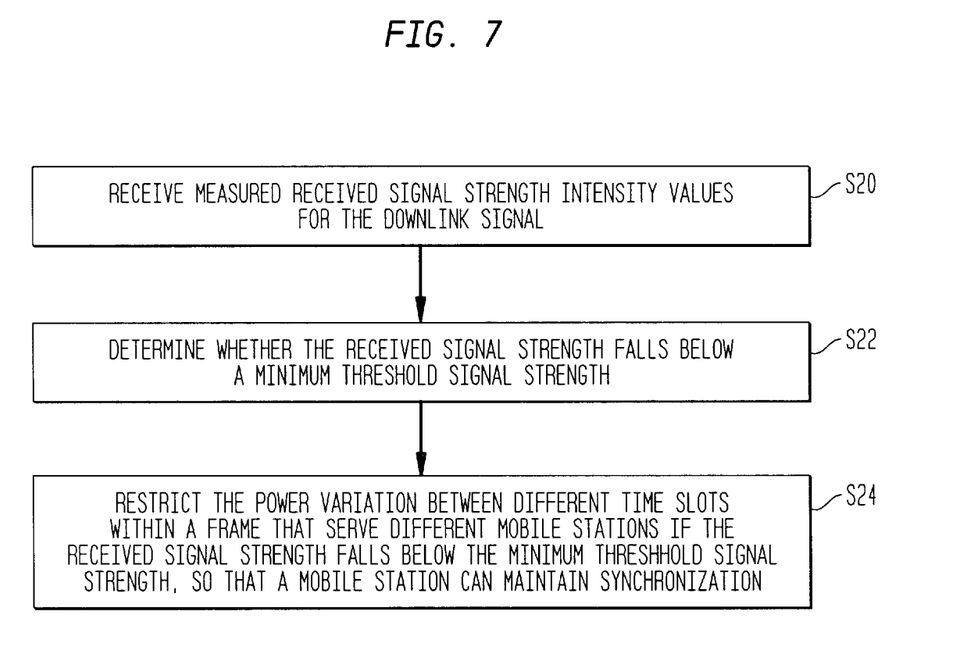
FIG. 7 is a flow diagram of a method of determining an adjustment of a downlink transmit power based on compliance with a reference adjustment range in accordance with the invention.

FIG. 7 shows a procedure that may be applied in step S16 of the method of FIG. 2. Basically, the procedure of FIG. 7 seeks compliance of a mobile station downlink power with a power variation range between different time slots. The power variation range may represent a suitable substitute for the reference adjustment range of FIG. 4. Thus, if the procedure of FIG. 7 is implemented, the reference adjustment range of FIG. 4 is not used for step S16 of FIG. 2.

Steps S20 through S24 of FIG. 7 are preferably carried out during step S16 of FIG. 2. After step S15 of FIG. 2 in step S20, the base station 16 receives measured received signal strength intensity values for the downlink signal. The mobile station provides a signal strength intensity value by using its signal parameter measurer. The mobile station transmits the signal strength intensity value on a reverse channel to the base station 16. The base station 16 determines whether the receive signal strength falls below a minimum threshold signal strength. The minimum threshold signal strength may be stored in the storage device in a database. The database would contain minimum threshold signals strengths for corresponding downlink channels. The minimum threshold signal strengths may be selected by a service provider by programming the base station 16 within limits defined by the base station 16 manufacturer.

The base station 16 restricts the power variation between different time slots in step S24. The power variation is restricted between different time slots within a frame that serve different mobile stations if the received signal threshold falls below the minimum threshold signal strength so that a mobile station can maintain synchronization. Thus, the restriction of the power variation between the different time slots and the entire procedure of FIG. 7 is applicable to certain mobile stations, such as pre-TIA/EIA IS-136 Revision A mobile stations.

Figure 8:
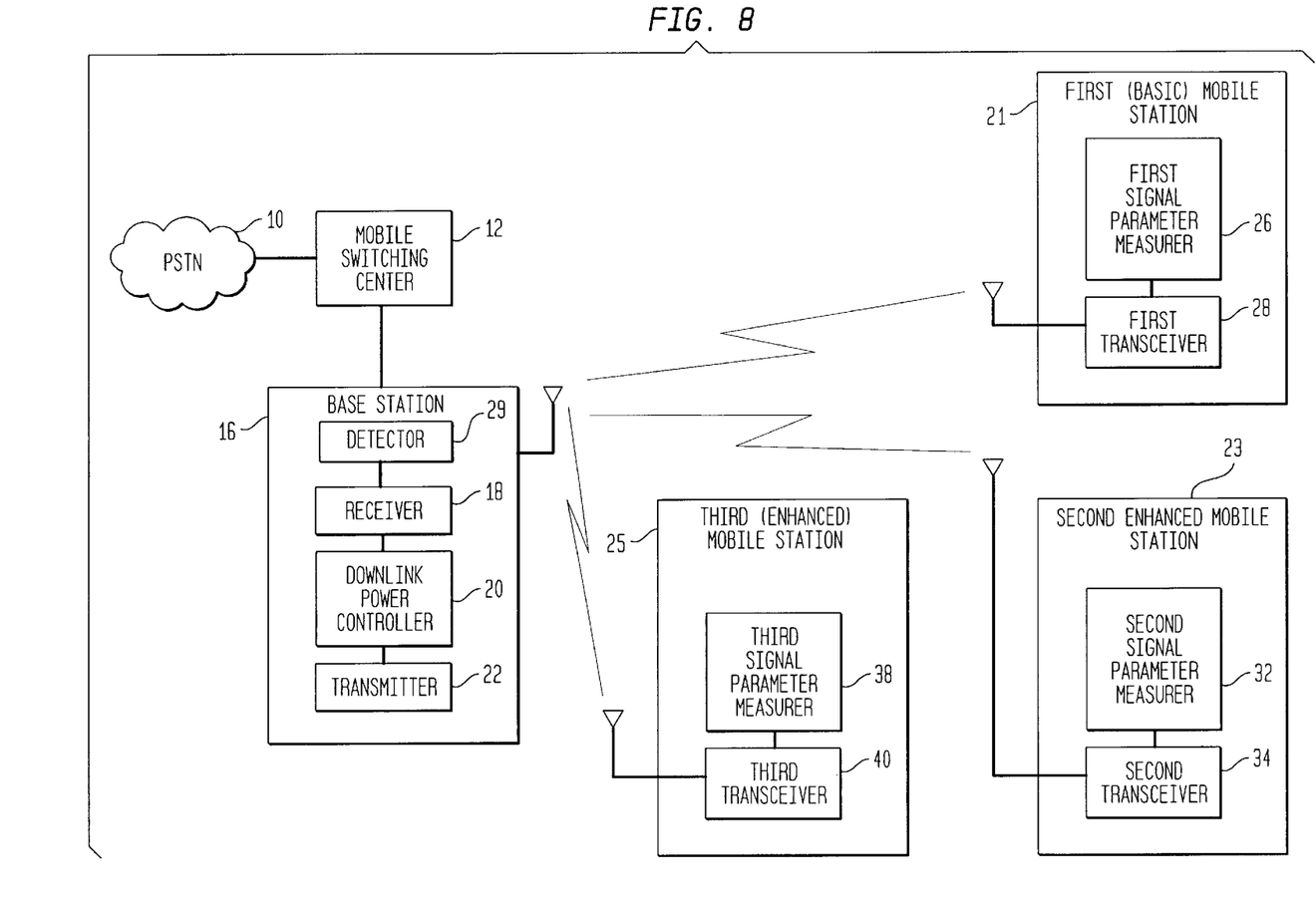
FIG. 8 is a block diagram of another embodiment of a wireless communications system in accordance with the invention.

FIG. 8 illustrates a wireless system that handles both basic mobile stations 21 and enhanced mobile stations (23, 25) on the same carrier. FIG. 8 is similar to FIG. 1 except the base station 116 includes a detector 29. The detector 29 detects whether mobile stations on a carrier represent enhanced mobile stations with special provisions for dynamic downlink power control or basic mobile stations. The base station 116 may service a first basic mobile station 21, a second enhanced mobile station 23 and a third enhanced mobile station 25 operating over a single carrier. Thus, the configuration of FIG. 8 requires the reference range and the absolute adjustment range to be executed in accordance with step S16 and FIG. 4 and FIG. 5.

The base station 116 is preferably compatible with a basic dynamic power control mode for basic mobile stations 21 and an enhanced dynamic power control mode for enhanced mobile stations (23, 25). The base station 16 may operate over the basic dynamic power control mode (using the method of FIG. 4 and FIG. 5) or the enhanced dynamic power control mode (using the method of FIG. 5) over a carrier.

The detector 29 operates in the following manner by detecting the presence or absence of an acknowledgement message from a mobile station over a reverse channel. Whenever the base station 116 seeks to change the dynamic power control mode between the basic dynamic power control mode and the enhanced dynamic power control modes, the base station 116 preferably sends a physical layer control message to the mobile stations (23, 25). The base station 116 does not change between the basic and enhanced modes without receiving appropriate acknowledgements from one or more mobile stations (23, 25) that confirms compatibility with the new mode. If any mobile station operating on a carrier is a basic mobile station, the base station 116 is not permitted to enter into an enhanced mode unless the basic mobile station 21 is reassigned to a different carrier or handed-off to another wireless base station. The base station 116 may use an ordinary mobile assisted hand-off report, although if an enhanced mobile assisted hand-off report is available the base station 116 could use the enhanced report to facilitate data exchange with the mobile station.

The method and system of the present invention is well-suited for reducing interference between neighboring cells in a wireless communication system by reducing some unnecessary downlink transmit power that otherwise would be transmitted to mobile stations, such as mobile stations near a cell site. Accordingly, the service provider of wireless communications system may be able to decrease the frequency reuse number or increase geographic density of the wireless system. Advantageously, certain versions of the present invention may be implemented without added new hardware to the infrastructure equipment, but by modifying software instructions.

The specification describes various illustrative embodiments with the system and the method of the invention. The scope of the claims is intended to cover various modifications and equivalent arrangements of the illustrative embodiments disclosed is the specification. Therefore, the following claims should be accorded the reasonably broadest interpretation to cover modifications, equivalent structures and features which are consistent with the spirit and scope of the invention disclosed herein.

What is claimed is:

1. A method for controlling downlink power in a time-division multiplex wireless system, the method comprising:
    obtaining a measured signal parameter value for a downlink transmit signal of a time-division multiplex channel;
    determining an initial adjustment for a downlink transmit signal power of the time-division multiplex channel if the measured signal parameter value differs from a target signal parameter value; and
    determining a revised adjustment for the downlink transmit power of the time division multiplex channel based on the initial adjustment and at least one adjustment range as appropriate to achieve synchronization of the demodulation of the downlink transmit signal, said synchronization including obtaining data from multiple time division multiplex channels on a single carrier.

2. The method according to claim 1 wherein the obtaining step includes receiving the measured signal parameter value in mobile assisted hand-off report.

3. The method according to claim 1 wherein the obtaining step comprises the steps of receiving a measured bit-error rate and converting the measured bit-error rate into a corresponding operational signal-to-interference ratio for comparison to the target signal parameter value.

4. The method according to claim 3 wherein the converting step includes referencing a conversion database containing bit-error rate interval associated with corresponding signal-to-interference ratios.

5. A method for controlling downlink power in a time-division multiplex wireless system, the method comprising:
    obtaining a measured signal parameter value for a downlink transmit signal of a time-division multiplex channel;
    determining an initial adjustment for a downlink transmit signal power of the time-division multiplex channel if the measured signal parameter value differs from a target signal parameter value; and
    determining a revised adjustment for the downlink transmit power of the time division multiplex channel based on the initial adjustment and at least one adjustment range as appropriate to achieve synchronization of the demodulation of the downlink transmit signal,
    further comprising the step of:
        adjusting the downlink transmit power of the time-division multiplex channel according to the revised adjustment such that time-division multiplex channels of a single carrier may have distinct downlink transmit powers within the at least one adjustment range.

6. A method for controlling downlink power in a time-division multiplex wireless system, the method comprising:
    obtaining a measured signal parameter value for a downlink transmit signal of a time-division multiplex channel;
    determining an initial adjustment for a downlink transmit signal power of the time-division multiplex channel if the measured signal parameter value differs from a target signal parameter value; and
    determining a revised adjustment for the downlink transmit power of the time division multiplex channel based on the initial adjustment and at least one adjustment range as appropriate to achieve synchronization of the demodulation of the downlink transmit signal,
    wherein the determining of the revised adjustment is based on a reference adjustment range as the at least one reference range, the reference adjustment range comprising a permissible adjustment range referenced to a maximum initial proposed downlink transmit power among time-division multiplex channels on a carrier.

7. The method according to claim 1 wherein the determining of the revised adjustment is based on an absolute adjustment range bounded by a maximum authorized transmit power.

8. The method according to claim 1 wherein the determining of the initial adjustment includes the steps of:
    determining an initial proposed power of each time-division multiplex channel associated with a carrier based on at least one target signal-to-interference goal; and
    determining a maximum initial proposed power among the time-division multiplex channels associated with the carrier.

9. The method according to claim 8 wherein the revised adjustment includes the steps of:

establishing a reference range with an upper limit set equal to the maximum initial proposed power and a lower limit having a certain offset from the upper limit; and setting a revised proposed power for a particular one of the time-division multiplex channels equal to the lower limit if the particular one has a initial proposed power lower than the maximum initial proposed power within the reference range.

10. The method according to claim 8 wherein the determining of the revised adjustment includes the steps of:

establishing a reference range with an upper limit set equal to the maximum initial proposed power and a lower limit having a certain offset from the upper limit;

setting a revised proposed power for a particular one of the time-division multiplex channel equal to the initial proposed power if the particular one has an initial proposed power within the reference range.

11. The method according to claim 1 wherein the determining the revised adjustment includes determining compliance of an initial proposed downlink transmit power, based on the initial adjustment, with a reference range and an absolute range.

12. The method according to claim 1 wherein the determining the revised adjustment includes determining compliance of an initial proposed downlink transmit power, based on the initial adjustment, with an absolute range for enhanced mobile stations, including TIA/EIA IS-136A compliant mobile stations.

13. A system for controlling downlink power in a time-division multiplex wireless system, the system comprising:

a receiver for receiving a measured signal parameter value for a downlink transmit signal of a time-division multiplex channel;

a downlink power controller for determining an initial adjustment for a downlink transmit signal power of the time-division multiplex channel if the measured signal parameter value differs from a target signal parameter value, the downlink power controller adapted to determine a revised adjustment for the downlink transmit power of the time division multiplex channel based on the initial adjustment and at least one adjustment range as appropriate to achieve synchronization of the demodulation of the downlink transmit signal, said synchronization including obtaining data from multiple time division multiplex channels on a single carrier.

14. A system for controlling downlink power in a time-division multiplex wireless system, the system comprising:

a receiver for receiving a measured signal parameter value for a downlink transmit signal of a time-division multiplex channel;

a downlink power controller for determining an initial adjustment for a downlink transmit signal power of the time-division multiplex channel if the measured signal parameter value differs from a target signal parameter value, the downlink power controller adapted to determine a revised adjustment for the downlink transmit power of the time division multiplex channel based on the initial adjustment and at least one adjustment range as appropriate to achieve synchronization of the demodulation of the downlink transmit signal, further comprising:

a transmitter for adjusting the downlink transmit power of the time-division multiplex channel according to the revised adjustment such that time-division multiplex channels of a single carrier may have distinct downlink transmit powers within the at least one adjustment range.

15. A system for controlling downlink power in a time-division multiplex wireless system, the system comprising:

a receiver for receiving a measured signal parameter value for a downlink transmit signal of a time-division multiplex channel;

a downlink power controller for determining an initial adjustment for a downlink transmit signal power of the time-division multiplex channel if the measured signal parameter value differs from a target signal parameter value, the downlink power controller adapted to determine a revised adjustment for the downlink transmit power of the time division multiplex channel based on the initial adjustment and at least one adjustment range as appropriate to achieve synchronization of the demodulation of the downlink transmit signal, wherein the revised adjustment is based on a reference adjustment range as the at least one reference range, the reference adjustment range comprising a permissible adjustment range referenced to a maximum initial proposed downlink transmit power among time-division multiplex channels on a carrier.

16. The system according to claim 13 wherein the receiver is coupled to a detector for detecting whether mobile stations on a carrier represent enhanced mobile stations with special provisions for dynamic downlink power control or basic mobile stations.

17. The system according to claim 13 wherein the power controller is adapted to operate in an enhanced mode in which downlink transmit powers transmitted on a single carrier may differ between the time-division multiplex channels of the carrier without regard to a maximum downlink transmit power of a time division multiplex channel on the carrier.

18. The system according to claim 13 wherein the power controller is adapted to operate in an basic mode in which downlink transmit powers transmitted on a single carrier may differ between the time-division multiplex channels of the carrier within a limited reference range with regard to a maximum downlink transmit power of a time division multiplex channel on the carrier.

19. The system according to claim 13 further comprising a base station including the receiver and the downlink power controller.

20. The system according to claim 19 wherein the base station supports a global system for mobile communications (GSM) standard for transmission of the downlink time-division multiplex channel.

21. The system according to claim 13 further comprising:

a conversion database containing bit-error rate intervals associated with corresponding signal-to-interference ratios, wherein said received measured signal parameter is obtained by measuring a bit-error rate, and retrieving a signal-to-interference ratio associated with said measured bit-error rate from said conversion database.

* * * * *